(12) United States Patent
Hopewell et al.

(10) Patent No.: US 8,008,822 B2
(45) Date of Patent: Aug. 30, 2011

(54) ELECTRICAL GENERATOR ARRANGEMENT

(75) Inventors: Paul D Hopewell, Leek (GB); Alan S Kinson, Nuneaton (GB)

(73) Assignee: Rolls-Royce PLC, London (GB)

( * ) Notice: Subject to any disclaimer, the term of this patent is extended or adjusted under 35 U.S.C. 154(b) by 256 days.

(21) Appl. No.: 12/385,827

(22) Filed: Apr. 21, 2009

(65) Prior Publication Data

US 2009/0289516 A1 Nov. 26, 2009

(30) Foreign Application Priority Data

May 22, 2008 (GB) .................................. 0809247.0

(51) Int. Cl.
*H02K 1/22* (2006.01)
(52) U.S. Cl. ........................................ 310/115; 310/152
(58) Field of Classification Search .......... 310/113–115, 310/268, 266, 152
See application file for complete search history.

(56) References Cited

U.S. PATENT DOCUMENTS

| | | | | |
|---|---|---|---|---|
| 279,476 A | * | 6/1883 | Ball | 310/115 |
| 889,883 A | * | 6/1908 | Johnson | 290/44 |
| 1,163,501 A | * | 12/1915 | Bell | 290/49 |
| 1,530,376 A | * | 3/1925 | Krawinkel | 310/159 |
| 1,787,930 A | * | 1/1931 | Fletcher | 290/4 C |
| 2,896,143 A | * | 7/1959 | Bekey | 318/730 |
| 7,453,180 B2 | * | 11/2008 | van den Bergh et al. | 310/156.37 |

FOREIGN PATENT DOCUMENTS

| | | |
|---|---|---|
| DE | 2 248 571 | 4/1974 |
| DE | 44 44 757 A1 | 6/1996 |
| GB | 585556 | 2/1947 |
| GB | 603438 | 6/1948 |
| GB | 603450 | 6/1948 |
| GB | 2 149 585 A | 6/1985 |
| GB | 2 402 976 A | 12/2004 |

* cited by examiner

*Primary Examiner* — Dang D Le
(74) *Attorney, Agent, or Firm* — Oliff & Berridge, PLC

(57) ABSTRACT

In some circumstances such as with regard to contra-rotating turbo prop arrangements in aircraft it is desirable to vary the pitch of the blades and/or provide de-icing facilities. Advantageously, these blade pitch and de-icing facilities could be provided through electrical actuators. Unfortunately, provision of electrical power to such rotating components traditionally requires utilization of slip rings which are subject to wear. By providing a self-contained electrical generator including a first hub and second hub with respective generator parts it is possible to utilize the contra-rotating nature in order to create relative motion and therefore electrical power generation in coils opposed by permanent magnets. Slide contacts for electrical connection are avoided whilst electrical power can be generated within the rotating reference frame defined by the hubs.

15 Claims, 3 Drawing Sheets

ELECTRICAL GENERATOR ARRANGEMENT

BACKGROUND

The present invention relates to electrical generators and more particularly, but not exclusively, to an electrical generator utilised with regard to a contra-rotating open-rotor propulsion system for an aircraft.

A number of propulsion systems are known for aircraft including open rotor and turbo-prop gas turbine engines. In such systems blades are presented upon a hub and drive given through an appropriate shaft in order to create rotation and therefore propulsion. Typically, the blades have a pitch variation mechanism whereby the angle of the blades can be altered to maximise propulsion effects. It is also known to provide each blade with a de-icing facility in order to remove ice which may build up and so alter the propulsion characteristics of the blade.

Generally, mechanical couplings are utilised in order to provide the force to alter and operate the pitch change mechanism for each blade. In such circumstances generally a complicated arrangement of rotating thrust plates, operating rods and other mechanical components is used to transfer force from an actulator in an engine nacelle to the blade system providing a rotating reference frame.

SUMMARY

It will be appreciated that in order to drive the pitch adjustment mechanism as well as provide power for de-icing facilities it is necessary to generate electrical power if electrical actuators are used. More recently it has been known to provide contra-rotating multi-bladed propellers. In such circumstances, two sets of blades are presented to rotate on respective hub parts in opposite directions. It can be difficult to integrate the engine design with mechanical designs for achieving electrical power generation.

It will be understood that electrically driven pitch actuating mechanisms which are mounted upon the same rotating reference frame as a blade assembly would allow control using a compact and controllable arrangement along with greater flexibility and easier installation. The pitch actuators could be in the hub itself or embedded deeper within the engine. In order to make such electrically driven actuators possible as indicated it is desirable to provide electrical power within the rotating frame of reference, that is to say the blade assembly. Such generation may be in the stationary reference frame such as through the aircraft main electrical system or be generated in the rotating frame itself. If generated in the stationary reference frame then it will be necessary to transfer the electrical power from the stationary to the rotating reference frame (blade hub). Such transfer will in itself create further problems with regard to the necessary use of a slip ring and brush system. Since the electrical connection is made by a stationary carbon brush or similar bearing against a rotating metal ring or vice versa it will be subject to mechanical wear. This mechanical wear will be in proportional to the speed of rotation and operating duration. Such wear will require frequent maintenance and such maintenance may not allow a desired interval between scheduled maintenance procedures. Furthermore, access to a slip ring connection is likely to be difficult and involve partial dismantling of the whole engine to allow maintenance.

In accordance with aspects of the present invention there is provided gas turbine engine comprising a contra-rotating rotor incorporating an electrical generator arrangement, the rotor arranged to cause in use movement of a first generator part relative to a second generator part, the generator characterised in that the rotor comprises a first hub and a second hub arranged in use to rotate in opposite directions with a gap between them, the first generator part in the first hub and the second generator part in the second hub with the second generator part opposite the first generator part across the gap.

Generally, the second generator part is magnetic and the first generator part is an electrical coil. Generally, the second generator part is a plurality of permanent magnets.

Generally, each hub half of the rotary hub includes a plurality of generator parts. Possibly, the generator parts present each first generator part and each second generator part across the gap with all first generator parts in the first hub and all second generator parts in the second hub. Alternatively, and advantageously, the generator parts comprise generator part pairs arranged by opposing a first generator part and a second generator part across the gap with either a first generator part or a second generator part in the first hub opposed with a respective first generator part or second generator part in the second hub. Generally, transformer parts in the same hub are concentric with each other with a respective first generator part and second generator part opposite each other in the respective first hub and the second hub of the rotor.

Typically, the generator parts extend fully or partially around the periphery of the first hub and the second hub.

Possibly, a gap adjuster is provided to allow variation in the gap in use.

Possibly, each hub in terms of generator parts is identical.

Possibly, the arrangement is associated with a plurality of electrical loads. Possibly, the loads relate to actuators for a blade pitch or a de-icer mechanism for a gas turbine engine. Typically, a switch is provided to allow switching between the electrical loads.

Possibly, the arrangement is associated with an electrical power conditioner mechanism. Typically, the power conditioner mechanism incorporates an electrical rectifier and/or means for electrical power stabilisation.

Possibly, the hubs are separately driven by a drive mechanism. Alternatively, the hubs are associated with a driven member which incorporates one or both of the transformer parts opposed by a respective transformer part in the hub.

Possibly, one of the hubs comprises a shaft or a rotor about which the other hub rotates.

Aspects of the present invention also relate to an engine or aircraft including a generator as described above.

BRIEF DESCRIPTION OF THE DRAWINGS

Embodiments of aspects of the present invention will now be described by way of example and with reference to the accompanying drawings:—

DETAILED DESCRIPTION OF EMBODIMENTS

Aspects of the present invention provide a means for generating electrical power in a rotating reference frame in the form of a hub. In such circumstances, it is not necessary to transfer the electrical power from a stationary generator to the rotating reference frame. Such an approach will avoid the necessity of slip rings and so considerably improve maintenance, reliability and capability of sustained operation.

Aspects of the present invention utilise the relatively high differential speeds produced by closely spaced contra-rotating elements in the form of hub halves with a gap between them. These contra-rotating elements are typically a respective first hub half and a second hub half utilised with regard to open rotor or a turbo prop propulsion systems for aircraft.

Figure 1:
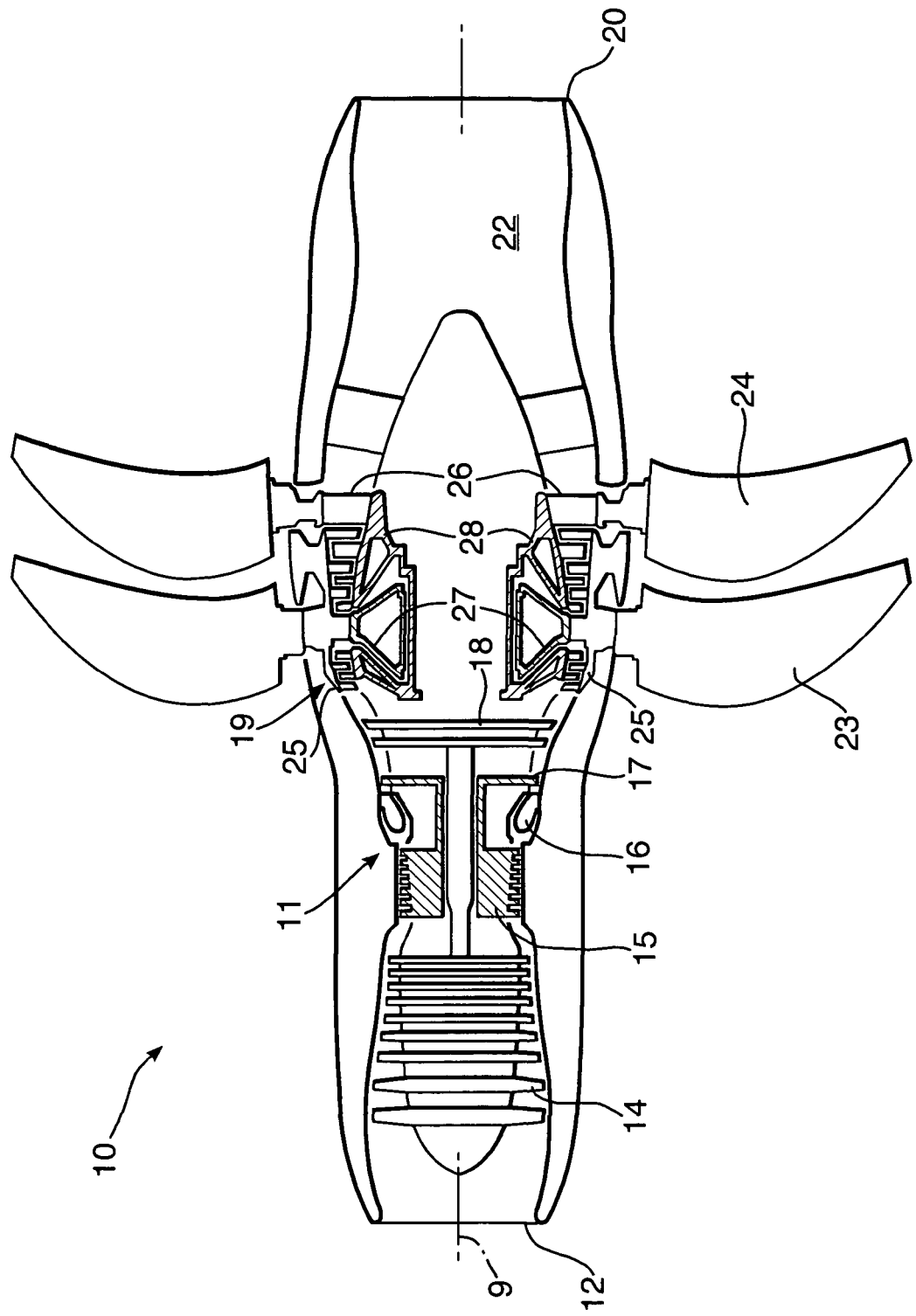
FIG. 1 is a schematic section of a twin-spooled, contra-rotating propeller gas turbine engine.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, an intermediate pressure compressor 14 (IPC), a high-pressure compressor 15 (HPC), combustion equipment 16, a high-pressure turbine 17 (HPT), low pressure turbine 18 (IPT), a free power turbine 19 (LPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26 mounted on respective hubs 27, 28.

The gas turbine engine 10 works in a conventional manner so that air entering the intake 13 is accelerated and compressed by the IPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust.

Figure 2:
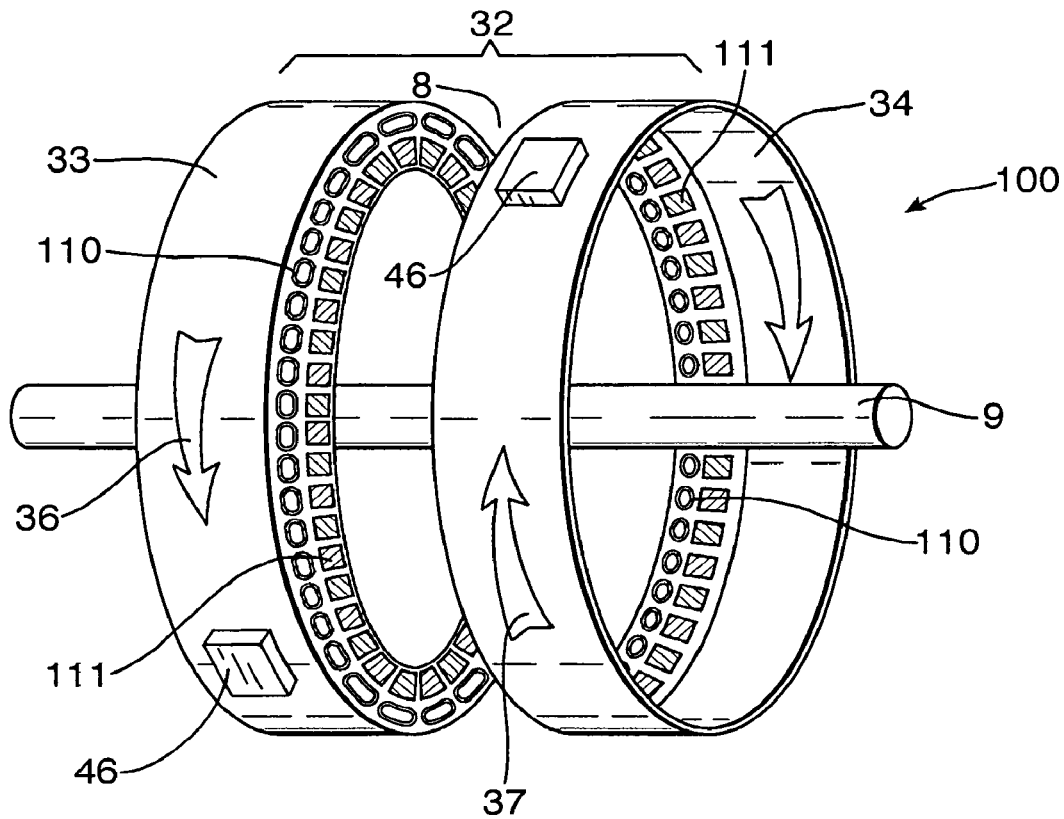
FIG. 2 is a schematic illustration of a first embodiment of an electrical generator in accordance with aspects of the present invention.

FIG. 2 provides a schematic illustration of an electrical generator 100 in accordance with a first embodiment of the present invention. The generator 100 comprises a rotor hub 32 having a first hub 33 and a second hub 34. In use the respective halves 33, 34 as indicated by arrowheads 36, 37 will rotate in opposite directions. Rotation of the hubs 33, 34 is through an appropriate drive mechanism and is typically about a common shaft or axis 9. There is a gap 8 between the halves 33, 34 which allows for separate rotation in the directions of arrowheads 36, 37.

In this embodiment, the electrical generator 100 is incorporated into the contra-rotating propeller gas turbine engine 10 of FIG. 1. The rotor hub 32 is configured as part of the contra-rotating turbine 19, where the contra-rotating hubs 27, 28 comprise the first hub 33 and the second hub 34 of the generator 100.

Opposed surfaces of the respective halves 33, 34 incorporate first generator coil parts 110 and second generator magnet parts 111. As will be described later, the respective first generator parts and second generator parts comprise a generator part pair, comprising a magnet and coil to allow electrical power generation. However, it will be appreciated that a single generator pair comprising first generator parts 110 and second generator parts 111 could be provided as a basic configuration in accordance with aspects of the present invention. As illustrated the parts 110, 111 are arranged substantially concentrically in each hub 33, 34 such that there is an interaction between a respective opposed first part 110 and a second part 111 in use in the hubs 33, 34 as they contra-rotate relative to each other. It is this contra-rotation and therefore electromagnetic interaction which generates electrical power for utilisation with respect to such loads as blade pitch variation actuators and/or a de-icer function in use with regard to a turbo prop propulsion mechanism.

The gap 8 will be set between the hub 33, 34 to achieve appropriate electromagnetic coupling and interaction between the parts 110, 111 to generate the electrical power as described above. The gap 8 may be variable in some circumstances in order to alter electrical power generation by reducing the extent of the electromagnetic interaction between the transformer parts 110, 111 in use.

Generally, the first generator parts 110 comprise electrical coils as shown in appropriate positions about the periphery of the hubs 33, 34. The second generator parts 111 comprise magnets and most typically permanent magnets in order to avoid electrical power couplings for utilisation of electromagnets in use. However, where such electrical couplings are possible it will be appreciated that the magnets 4 may be electromagnets or it may be possible to provide batteries within the generator 100 in order to power electromagnets 111 in use. The batteries may be charged when the hub is stationary. However, such an approach is generally contrary to the objective of providing self contained electrical power generation within the rotary frame constituted by the rotor 32 without necessity for electrical couplings such as slip rings etc. A further option is to use electromagnets to augment (positively or negatively) the field produced by the permanent magnet to give additional control over the generated voltage. In this arrangement the initial energisation of the electromagnets could be accomplished using the generation capability of the permanent magnets and as the resulting voltage builds, so may the electromagnet's field.

Figure 3:
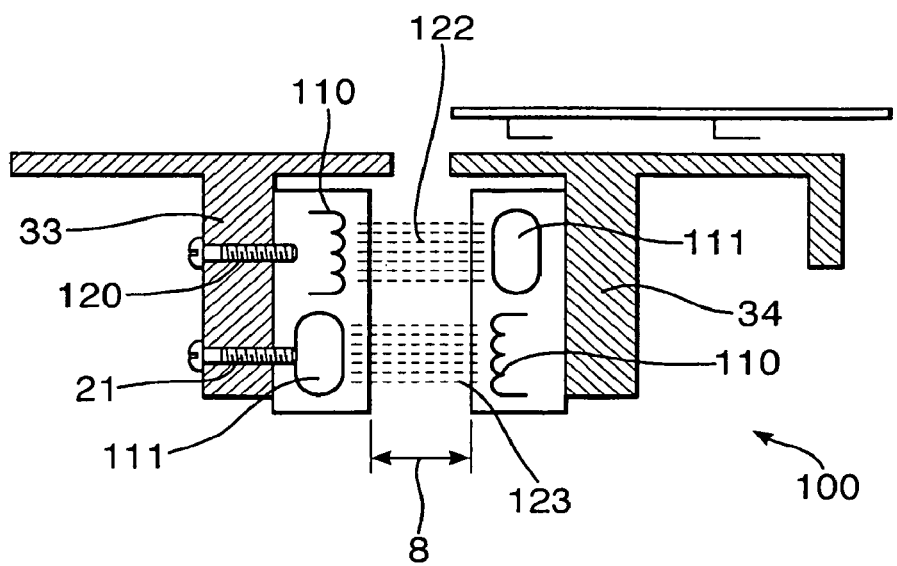
FIG. 3 is a schematic part cross section illustrating the generator parts in hub halves in accordance with the embodiments of aspects of the present invention depicted in FIG. 1; and, FIG. 4 is a schematic perspective view of a second embodiment of an electrical generator in accordance with aspects of the present invention.

It is by interaction between the first generator parts and the second generator parts that electrical power is generated. FIG. 3 provides a schematic part cross section of the arrangement 1 depicted in FIG. 2. It will be noted that the generator parts 110, 111 are robustly secured through appropriate fastenings 120, 121 such that in use despite the high speed rotation of the hubs 33, 34 the generator parts 110, 111 are appropriately presented opposite each other across the gap 8. In such circumstances, the relative rotation of the hub 33, 34 generates an electromagnetic interaction depicted by respective broken lines 122, 123. In such circumstances, an electromotive force will be induced in the coils defined by the first generator parts 111 and these coils will be connected through electrical wiring to electrical loads 46 such as blade pitch actuators or de-icer mechanisms.

It will be appreciated that the width of the gap 8 will be significant with regard to electrical power generation. Possibly, the gap will be in the order of 10 mm. The closer the gap 8 the greater the electromagnetic interaction but clearly a gap 8 of a reasonable extent is required in order to take account of rotational eccentricities of hubs 33, 34 which may be as a result of loading upon associated blades to the hubs 33, 34. It may be in some circumstances it is possible to provide for variation in the width of the gap 8 through an appropriate gap adjuster (not shown). Such an approach may allow variations in the electromagnetic interactions 122, 123 and therefore the efficiency of electrical power generation within the coils defined by the first transformer parts 110.

Generally, the hubs 33, 34 as illustrated will incorporate respective generator part pairs with a first part 10 in each hub 33, 34 and a second generator part 111 opposite in each hub 33, 34.

Generally, each hub 33, 34 will be substantially identical in terms of presentation of first generator parts 110 and second generator parts 111. As it is the rotation in cutting across the respective parts 110, 111 which will generate the electrical power, it will be understood that the number and distribution of such parts 110, 111 will be determinate with regard to electrical power generation. Typically, as illustrated, each respective hub 33, 34 will incorporate a plurality of first generator parts 10 and second generator parts 111 arranged in a ring or partial ring around a periphery of the hubs 33, 34. Generally, it is important that the first generator parts in the form of coils and the second generator parts in the form of magnets are arranged such that the magnets (second generator parts 111) are closely coupled for held engagement with the coils (first generator parts 110) in each respective hub 33, 34 and vice versa. By such close association the differential rotation between the hubs 33, 34 will cause an electromotive force to be induced within the coils on each rotating hub due to the movement of the magnets past their respective coils.

By providing a generator 100 as described above, it will be understood that a substantially self contained electrical generator is provided within the rotating reference frame constituted by the rotor 32. In such circumstances, it is not necessary to provide an electrical connection from a stationary or static generator through slip rings.

Clearly, space will be a significant factor with regard to acceptability with regard to electrical generators in accordance with aspects of the present invention. By appropriate analysis it is possible to generate within a typical turbo prop or contra rotating arrangement in the order of 500 kW of generation capacity between the two hubs 33, 34. However, typically, it will only be necessary to generate in the order of 50 to 60 kW in order to provide a pitch variation drive mechanism or actuator and/or an electrical blade de-icer system. Such reduced requirements may limit the number of coils required and therefore the mass and/or volume of an electrical generator in accordance with the present invention.

Figure 4:
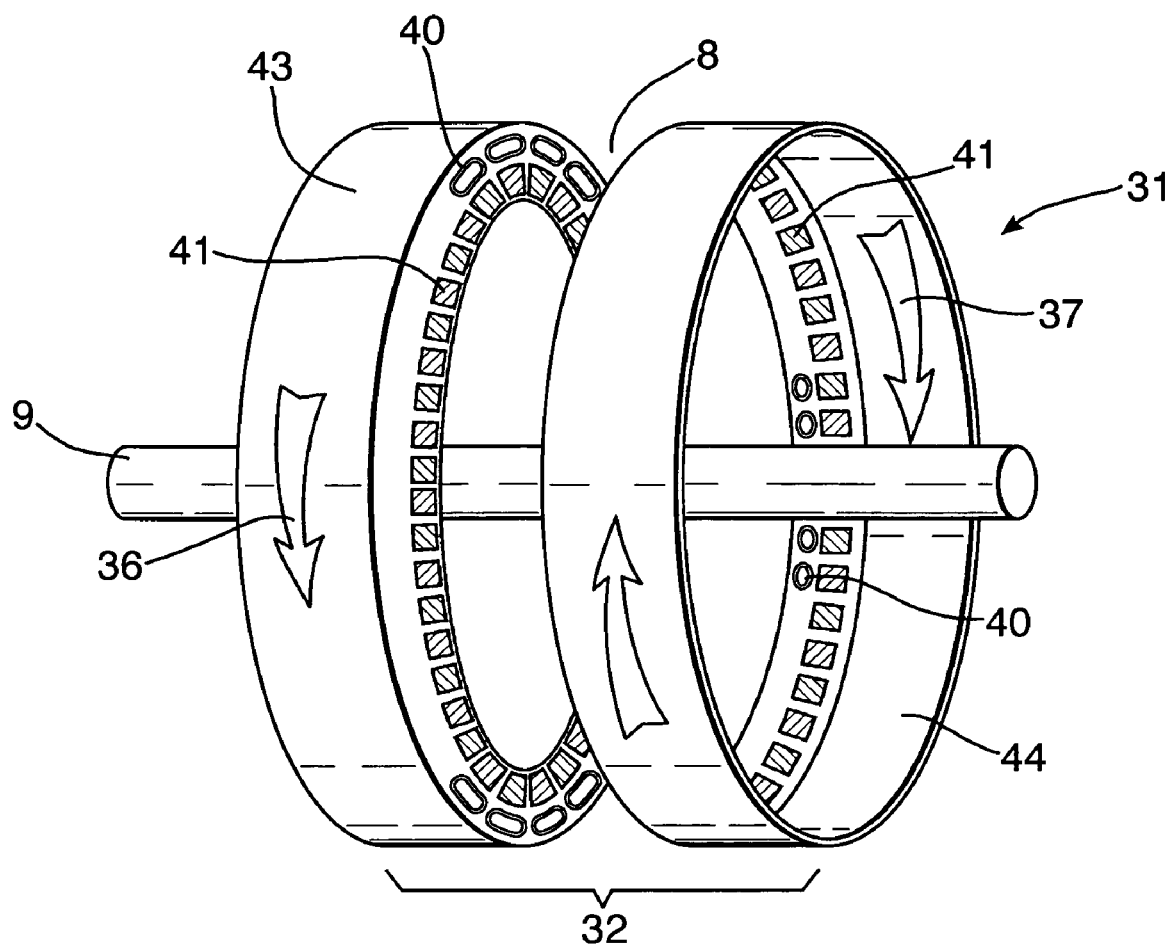

As with the first embodiment to the present invention, the second embodiment shown in FIG. 4 comprises the electrical generator 100 incorporated into the contra-rotating propeller gas turbine engine 10 of FIG. 1. The rotor 32 is configured as part of the contra-rotating turbine 19, as an example, where the contra-rotating hubs 27, 28 comprise the first hub 43 and the second hub 44 of the generator 100.

FIG. 4 provides a schematic front perspective view of a second embodiment of the present invention with respect to an electrical generator 31 in which respective hubs 43, 44 rotate in opposite directions as illustrated by arrowheads 36, 37. A gap 8 is provided between the hubs 43, 44 and as can be seen opposite surfaces of the hubs 43, 44 respectively incorporate first generator parts 40 and second generator parts 41 arranged around the periphery of the hubs 43, 44. It will be noted that a ring of second generator parts 41 is provided whilst only a small proportion of the peripheral surface of the hubs 43, 44 incorporates coils in the form of first generator parts 40. In such circumstances, electrical power generated will be reduced as indicated above to that necessary but more particularly in accordance with this aspect of the present invention the weight of further coils which are unnecessary in the first generator part 40 is avoided. In terms of other operation as indicated the hubs 43, 44 again rotate in opposite directions typically around a shaft or common axis 9 and in such circumstances operate in a similar fashion to that described above with regard to FIG. 2 and FIG. 3 above.

As indicated above, matching the capacity of the electrical generator in accordance with aspects of the present invention with potential loads in the effectively self contained and isolated generator system has advantages in terms of minimising mass and volume. In such circumstances, consideration of typical loads which may be presented to the electrical generator can be made. These loads, as indicated above, particularly may relate to pitch variation mechanisms and mechanisms for de-icing. The necessary electrical capacity for the generator can be determined by summing all of the potential loads which may be applied. Such an approach will obviously create an electrical generator which for most stages and periods of operation the arrangement has a capacity which is significantly greater than that necessary. To optimise usage consideration of natural diversity factors and thermal gradients as well as thermal inertia will allow potential switching between the loads. For example, as indicated, one load may relate to de-icing and therefore it may be possible to switch off such de-icing functions while the pitch variation actuator is operational. Once the desired pitch for each blade has been achieved the de-icing function can then be resumed. Such an approach will require use of a suitable controller which can oversee such load balancing to ensure that the functional objectives are met whilst safety is not compromised.

It will be understood that the electrical output from the coils in a generator in accordance with aspects of the present invention will be an alternating current. However, during operation typically the speed of rotation between the respective hub halves will not be constant as there will typically be a different optimised speed for each phase of flight with respect to contra rotating turbo prop arrangements. These changing speeds will clearly alter the frequency of the alternating current output and furthermore, as excitation is via permanent magnets in the preferred embodiment, the output voltage will change with the operating speed. In such circumstances, generally, in accordance with aspects of the present invention the electrical generator will incorporate suitable power conditioning facilities such as for rectification and voltage stabilisation in order to ensure an adequately stable power supply is provided to the loads such as the pitch variation actuators or de-icing mechanism along with associated controls and systems.

By aspects of the present invention it will be appreciated that an electrical power generator is provided within which electrical power can be generated in a self contained manner within the rotating hub of a contra-rotating aircraft propulsion system. The generator can be made entirely independently and from solid state components and therefore is free from moving parts. It will be appreciated that avoiding soft moving parts which wear will improve reliability. Even though the parts rotate within the rotary frame they are static with respect to other parts of the generator. It will be understood that aspects of the present invention avoid utilisation of sliding contacts which will inherently wear in use and require regular maintenance.

By utilisation of a multiplicity of permanent magnets for excitation of independent electrical coils it will be understood that the generator in accordance with aspects of the present invention has a high tolerance to faults and therefore is a highly reliable source of electrical power in use.

Although described with regard to propulsion systems for an aircraft in the example described above, it will also be understood that aspects of the present invention could be utilised with respect to other installations where there are differential speeds developed between elements that rotate in opposite directions in order to effectively double the operating speed of the generator.

It will be understood that existing differential motion between two separate elements and a common third element such as a shaft may be utilised in order to provide the necessary relative motion and interaction between the generator parts in accordance with aspects of the present invention. For example, where there is a high speed shaft rotating at in the order of 5000 rpm that shaft may carry permanent magnets and rotating hubs may carry coils for electrical power generation. These hubs may incorporate power conversion devices and may be driven at a lower speed and in opposite directions to each other. In such a way the relative speed between the relatively slowly rotating hubs as one hub half and the faster rotating drive shaft as the other hub half will enable a more compact design for a given power generation requirement even though it may be necessary to embed such arrangements within other machinery.

Modifications and alterations to aspects of the present invention will be appreciated by persons skilled in the technology. In such circumstances, as described above, the coils utilised as the first generator parts in accordance with aspects of the present invention may be arranged to be operable only in a proportion of the periphery of the hub half. Nevertheless, several segments may be configured in appropriate pairs such that elective switching into operation of coil segments may be provided to vary the electrical power value generated by a generator in accordance with aspects of the present invention. Furthermore, means for laterally displacing the generator parts and in particular the magnetic second generator parts relative to the first generator parts may be provided in order to adjust interaction and therefore electrical power generation. The number of segments in operation may be dependent upon a centrifugal switch tied to the rotational speeds of the hub.

As shown in FIG. 1, the present invention is particularly applicable to a gas turbine engine having contra-rotating rotors and in this exemplary case an open rotor or propeller engine. Nonetheless, other contra rotating compressors and turbines of gas turbines (including aero, industrial, vehicular or marine) may comprise the generator 100 of the present invention.

The invention claimed is:

1. A gas turbine engine comprising:
a contra-rotating rotor incorporating an electrical generator arrangement,
the contra-rotating rotor including a first hub and a second hub being spaced apart to define a gap and configured to rotate in opposite directions, and
the electrical generator arrangement including a first generator part and a second generator part in each of the first and second hubs, each of the first generator parts in the first hub and second hub being paired with each of the second generator parts in the second hub and the first hub, respectively,
wherein the contra-rotating rotor further includes electrical loads provided on the first and second hubs and configured to connect to the first and second generator parts of each of the first and second hubs, respectively.

2. The gas turbine engine as claimed in claim 1, wherein the second generator part is magnetic and the first generator part is an electrical coil.

3. The gas turbine engine as claimed in claim 1, wherein the second generator part is a plurality of permanent magnets.

4. The gas turbine engine as claimed in claim 1, wherein each hub of the contra-rotating rotor includes a plurality of first and second generator parts.

5. The gas turbine engine as claimed in claim 4, wherein the plurality of first and second generator parts present each first generator part and each second generator part across the gap with all first generator parts in the first hub and all second generator parts in the second hub.

6. The gas turbine engine as claimed in claim 4, wherein the plurality of first and second generator parts in a same hub are concentric with each other with a respective first generator part and second generator part opposite each other in the respective first hub and the second hub part of the rotor.

7. The gas turbine engine as claimed in claim 6, wherein the first generator part is located radially inward from the second generator part in the first hub and the second generator part is located radially inward from the first generator part in the second hub.

8. The gas turbine engine as claimed in claim 1, wherein the plurality of first and second generator parts extend fully or partially around the periphery of the first hub and the second hub.

9. The gas turbine engine as claimed in claim 1, wherein the first and second generator parts within each hub are connected to a plurality of electrical loads located on that hub.

10. The gas turbine engine as claimed in claim 9, wherein the plurality of electrical loads include at least one of an actuator for blade pitch control and a de-icer mechanism.

11. The gas turbine engine as claimed in claim 9, wherein a switch is provided to allow switching between the plurality of electrical loads.

12. The gas turbine engine as claimed in claim 1, wherein the electrical generator arrangement is associated with an electrical power conditioner mechanism.

13. The gas turbine engine as claimed in claim 1, wherein the first hub and the second hub are separately driven by a drive mechanism to cause relative motion between the first hub and the second hub.

14. The gas turbine engine as claimed in claim 1, wherein the first hub and the second hub are associated with a propeller which incorporates one or both of the first and second generator parts opposed by a respective first and second generator parts in the first hub or the second hub.

15. The gas turbine engine as claimed in claim 1, wherein the first hub is a shaft or rotor and the second hub is arranged to rotate about the shaft or rotor.

\* \* \* \* \*